US011182520B2

(12) United States Patent
Raghavan et al.

(10) Patent No.: US 11,182,520 B2
(45) Date of Patent: Nov. 23, 2021

(54) MULTIPHYSICS AUTOMATED SUPPORT GENERATION FOR ADDITIVELY MANUFACTURED COMPONENTS

(71) Applicant: General Electric Company, Schenectady, NY (US)

(72) Inventors: Sathyanarayanan Raghavan, Niskayuna, NY (US); Ananda Barua, Schnectady, NY (US); Prabhjot Singh, Guilderland, NY (US); Arvind Rangarajan, San Ramon, CA (US); Changjie Sun, Schnectady, NY (US); Dean Robinson, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 14 days.

(21) Appl. No.: 16/456,333

(22) Filed: Jun. 28, 2019

(65) Prior Publication Data

US 2020/0410060 A1 Dec. 31, 2020

(51) Int. Cl.
*G06F 30/20* (2020.01)
*B29C 64/393* (2017.01)
(Continued)

(52) U.S. Cl.
CPC ............ *G06F 30/20* (2020.01); *B29C 64/393* (2017.08); *B29C 64/40* (2017.08); *B33Y 40/00* (2014.12);
(Continued)

(58) Field of Classification Search
CPC .... B33Y 10/00; B33Y 20/02; G05B 19/4099; B22F 3/1055
See application file for complete search history.

(56) References Cited

U.S. PATENT DOCUMENTS 10,011,079 B2 7/2018 Wighton et al.
2014/0335313 A1* 11/2014 Chou ..................... B33Y 10/00
700/97
(Continued)

FOREIGN PATENT DOCUMENTS

EP 3050650 8/2016

OTHER PUBLICATIONS

Malekipour et al., Heat Conduction and Geometry Topology Optimization of Support Structure in Laser-based Additive Manufacturing, 2018, Purdue School of Engineering and Technology, Indianapolis, IN, USA vol. 9 (pp. 17-27), (Year: 2018).*

(Continued)

*Primary Examiner* — Kidest Bahta
(74) *Attorney, Agent, or Firm* — Hanley, Flight & Zimmerman, LLC

(57) ABSTRACT

A method, medium, and system to execute an additive manufacturing (AM) simulation on a model of a part; determine, based on the AM simulation, a prediction of a temperature and displacement distribution in the part at a particular time in the AM process; apply the predicted temperature and displacement distributions in the part as a boundary conditions on a support design space to determine a temperature distribution throughout the support design space; and execute a thermal-structural topology optimization based on the determined temperature and displacement distributions throughout the support design space to determine a distribution of material in the design space for a thermal support structure to interface with the part that optimally reduces a thermal gradient in the part with a minimum of material and results in the generation of an optimized AM support structure.

20 Claims, 8 Drawing Sheets

(51) Int. Cl.
  *B29C 64/40*  (2017.01)
  *B33Y 40/00*  (2020.01)
  *B33Y 50/02*  (2015.01)
  *G06F 119/08* (2020.01)
  *G06F 119/18* (2020.01)

(52) U.S. Cl.
  CPC ........... *B33Y 50/02* (2014.12); *G06F 2119/08* (2020.01); *G06F 2119/18* (2020.01)

(56) References Cited

U.S. PATENT DOCUMENTS

| | | | |
|---|---|---|---|
| 2015/0352794 A1* | 12/2015 | Nguyen | B29C 64/393 700/98 |
| 2016/0107393 A1 | 4/2016 | Hartmann et al. | |
| 2017/0212979 A1* | 7/2017 | Cheng | B33Y 50/00 |
| 2017/0232515 A1* | 8/2017 | DeMuth | B33Y 10/00 419/53 |
| 2017/0372480 A1* | 12/2017 | Anand | G06T 19/20 |
| 2018/0029306 A1 | 2/2018 | Gold et al. | |
| 2018/0111334 A1* | 4/2018 | Gold | B22F 3/1055 |
| 2019/0056717 A1* | 2/2019 | Kothari | G05B 6/00 |
| 2019/0079491 A1* | 3/2019 | Barua | B29C 64/40 |

OTHER PUBLICATIONS

International Searching Authority, "Seach Report and Written Opinion," issued in connnection with PCT patent application No. PCT/US2020/039748, dated Oct. 8, 2020, 14 pages.
Matthijs Langelaar, "Topology Optimization For Additive Manufacturing With Controllable Support Structure Costs," ECCOMAS Congress 2016, 11 pages.

\* cited by examiner

MULTIPHYSICS AUTOMATED SUPPORT GENERATION FOR ADDITIVELY MANUFACTURED COMPONENTS

BACKGROUND

The field of the present disclosure generally relates to additive manufacturing, and more particularly, to an additive manufacturing methodology and tool to determine optimal support structures for an additive manufacturing process.

Parts generated using additive manufacturing (AM) processes oftentimes require sacrificial support structures that facilitate the part build, where the support structures do not ultimately comprise a portion of the part being built. In some respects, the support structures might provide a measure of structural stiffness to the part during the AM build of the part. In some other respects, a support structure might provide a thermal pathway for thermal energy to be rejected from the part. In general, support structures might be used in regions of a part with an overhang and non-overhang surfaces that might need to be stabilized against distortions.

In a number of AM processes, a thermal gradient might be produced in a part during the production thereof. A high thermal gradient occurring in the part during the build of the part might at least contribute to a distortion of the part. Distortions of the part may result in a AM build failure and/or rejection of the part for not meeting one or more design specifications.

Accordingly, in some respects, a need exists for methods and systems that provide an efficient and accurate mechanism for designing AM parts and/or support structures that reduce thermally driven stress and distortions during an AM process.

DETAILED DESCRIPTION

Figure 1:
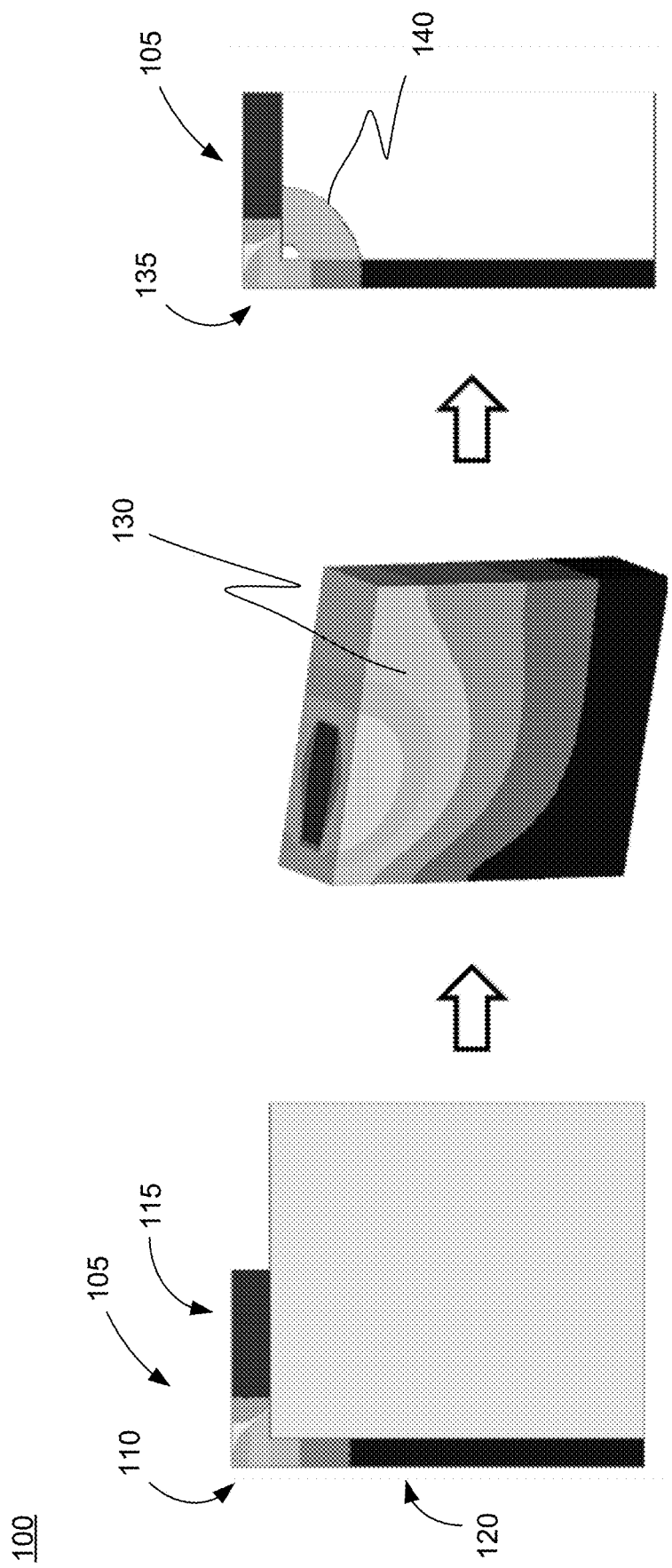
FIGS. 1A-1C are illustrative depictions of various phases of an automatic support generation process, in accordance with some aspects of an example process herein.

Embodying systems and methods herein relate to Additive Manufacturing (AM) systems that, in general, produce a three-dimensional (3D) object or assembly by printing materials under computer control. AM may successively add materials, for example in layers, to create the three-dimensional assembly or object based on 3D model data (i.e., a specification) of the part. In general, parts, including assemblies comprising a plurality of parts, generated using AM processes might require support structures that facilitate the part build, wherein the support structures might provide a measure of structural stiffness and/or a thermal pathway for thermal energy to be rejected from the part during the AM build of the part. The support structures may be affixed or anchored to a base plate. Whereas traditional AM processes typically design parts and add supports for the additive build to complete successfully, the present disclosure discloses a methodology and system herein that optimizes the structure of the part and the support together to reduce or eliminate thermal gradients in the part during the AM build process while simultaneously allowing the support to also perform other structural requirements.

In some aspects, the technological aspects disclosed herein include methods and systems for automated support generation of AM parts. In some aspects, processes and systems herein might minimize part distortions due to, at least, thermal gradients generated in a part during an AM process build with optimally designed support structures using a minimal amount of support material.

In some embodiments, the present disclosure includes a methodology that executes an AM simulation of a part to determine or obtain a temperature distribution in the part as a result of the AM simulation process. In some instances, the AM simulation is configured to account for and consider all relevant inputs and constraints that may have a meaningful impact on a production of the part so that the AM simulation produces an accurate indication of the thermal distribution (i.e., gradient) throughout the part being produced. In this manner, the AM simulation can provide an accurate prediction of the thermal distribution in the part if (when) the part were to actually be generated by an AM process corresponding to the AM simulation.

The results of the AM simulation are then provided as an input to a topology optimization process or routine. In particular, the input may be a distribution of temperature in the part, assuming there is no support structure at various time-points in the AM simulation process. That is, the input is a predicted representation of the temperature distribution in the part due to the AM simulation of the part alone. A design space is created for a support structure for the part and the temperature and displacement distribution is used as a boundary condition for the optimizer to allow thermal loads to be applied during the topology optimization process. The combined thermal and structural loads are then used to determine an optimized support structure for the part. The way the optimizer works is to allow for a thermal load path for region(s) of the model where high temperature gradients may exist. It is noted that region(s) of the part with a high temperature gradient may not necessarily correspond to those region(s) that may distort or otherwise change from their specified shape or configuration during an AM build. In other words, both the thermal and displacement boundary conditions together contribute to the resulting deformation of the part-support geometry, and considering only temperature gradients or only displacement field may not result in the optimum support structure. In some embodiments, the temperature distribution for the part may be obtained from a "last load-step" (i.e., at a conclusion of the AM simulated production of the part) or at multiple "load-steps" (e.g., at different, distinct times throughout the AM simulated build).

The optimizer may be configured to consider all of the load-cases or time-points (e.g., the one final load or the multiple intermediate loads) and determine a solution that satisfies the design constraints (e.g., maximum allowable distortion for a region) for all load-cases. Based on this determination, a support structure can be designed and/or the part can be modified to reduce or eliminate the predicted high temperature gradient regions in the part by the designed support structure that provides a thermal pathway for thermal energy from the part via the support structure. In this manner, the part may be realized by AM with a minimum of thermal-structural distortion.

FIGS. 1A-1C are illustrative depictions of various phases of an automatic support generation process 100, in accordance with some aspects of an example process herein. Process 100 may be implemented by one or more software and hardware components, whether commercially available, proprietary, open-source, and combinations thereof. Process 100 relates to a topology optimized (TO) process wherein a design space is created at operation 105. The design space may be created within a design software application and is used to determine where and how much support material is used within the design space for a particular design project and its objectives.

In FIG. 1A, an AM simulation process is executed to produce a part 105. Part 105 may be produced based on a model or specification of the part that is provided as an input to the AM simulation process. The model may include a specification including one or more of a model part's geometry, part orientation, AM system/device capabilities, etc. In some embodiments, aspects relating directly to the capabilities, whether input criteria and/or output constraints, of the AM simulator might be specified in the model of the part and/or be specified in a separate record, file, data stream, or other data structure (e.g., database table, etc.) provided to the AM simulation process. The AM simulation "generates" part 105, having a temperature distribution therein due to the production of the part by the AM build process. In FIG. 1A, the temperature distribution is represented by the various shading shown in regions 110, 115, and 120 of part 105, wherein the different shaded areas each correspond to different ranges of temperatures. Notably, a high temperature gradient is shown in region 110. As discussed above, a high temperature gradient produced in a part during an AM build process may result in distortions in the part. A support design space 125 is also depicted in FIG. 1A. In some embodiments, the AM simulation is executed for the part alone (i.e., no support or other structures/assemblies in support design space 125 during the AM simulation).

FIG. 1B is an illustrative depiction of the result of the predicted temperature distribution determined in FIG. 1A as an output of the AM simulation being applied to the surface of the support design space 125 at interfacing areas of the part and the support design space. That is, the predicted temperature distribution is applied the surface/skin interface(s) of the part and the support design space. In particular, FIG. 1B shows a representation of the result of a conduction analysis process that determines the temperature distribution 130 throughout support design space 125 based on the application of the predicted temperature distribution from the AM simulation.

FIG. 1C is an illustrative depiction of part 105 and a support structure 140 designed by an optimizer that uses only the temperature distribution 130 determined for the support design space 125 as an input thereto and does not utilize a displacement field from the AM simulation. Execution of the optimizer yields the (unexpected) support structure 140. As shown, the severity of the temperature gradient 135 in part 105 in FIG. 1C is reduced as compared to temperature gradient 110 in part 105 in FIG. 1A. The reduction in the temperature gradient in FIG. 1C is due to support structure 140, wherein the particular size, orientation, and interface(s) of the support structure with part 105 are optimally determined by the optimizer that determines the location and amount of material in the support design space to reduce or eliminate the predicted thermal distribution in the part, thereby reducing the distortions caused by high temperature gradients during an AM build process.

In the example of FIGS. 1A-1C, the optimizer determined that a support structure filling a majority of the support design space 125 was not necessary to reduce the thermal gradient(s) in part 105 by a support structure (e.g., 140) interfaced with the part. In some aspects, the amount and location of material (e.g., a particular metal, plastic, etc.) may depend on one or more of the design specifications of the part, the material(s) available and/or required for the support structure, capabilities of the AM process to be used in the manufacture of the part and support structure, and constraints of the support design space, whether alone or in combination with one or more of these or other factors/considerations.

In some aspects, based on the result of an optimization herein, a number of actions or applications of the optimization's determinations may be made. For example, (1) the design of part (e.g., part 105 in FIG. 1C) may be modified to include changes informed by the optimization, (2) a support structure can be designed to be created during an AM build, wherein the support structure will be finally removed after the part is built via the AM process (e.g., support structure 140), and (3) a support structure may be generated that leaves a small gap (e.g., a reasonable gap may be, but not limited to, about 500 microns to about 2 millimeters, depending upon the printer, material and part being printed) between the support structure and the part, wherein the gap acts as a heat conduction path although the support structure provides no structural support to the part. In some embodiments, a combination of these, and/or other applications or uses may be employed to leverage the results of an optimization herein. For example, the part and/or a support structure for the AM build of the part may be changed in one of shape, dimensions, and manufacturing material in light of the optimization and/or refinements thereof (e.g., additional iterations of an initial optimization). In some aspects, an optimization herein might yield a support design and the AM process might be re-run (re-executed) to yield a re-optimized support structure. In some instances, multiple iterations may be executed until the resulting support design reduces the thermal gradients in the part such that design specifications (e.g., part distortions) for the part are satisfied, the support structure satisfies design constraints placed thereon, and other considerations until the part can be produced with the desired or requisite design tolerances.

Figure 2:
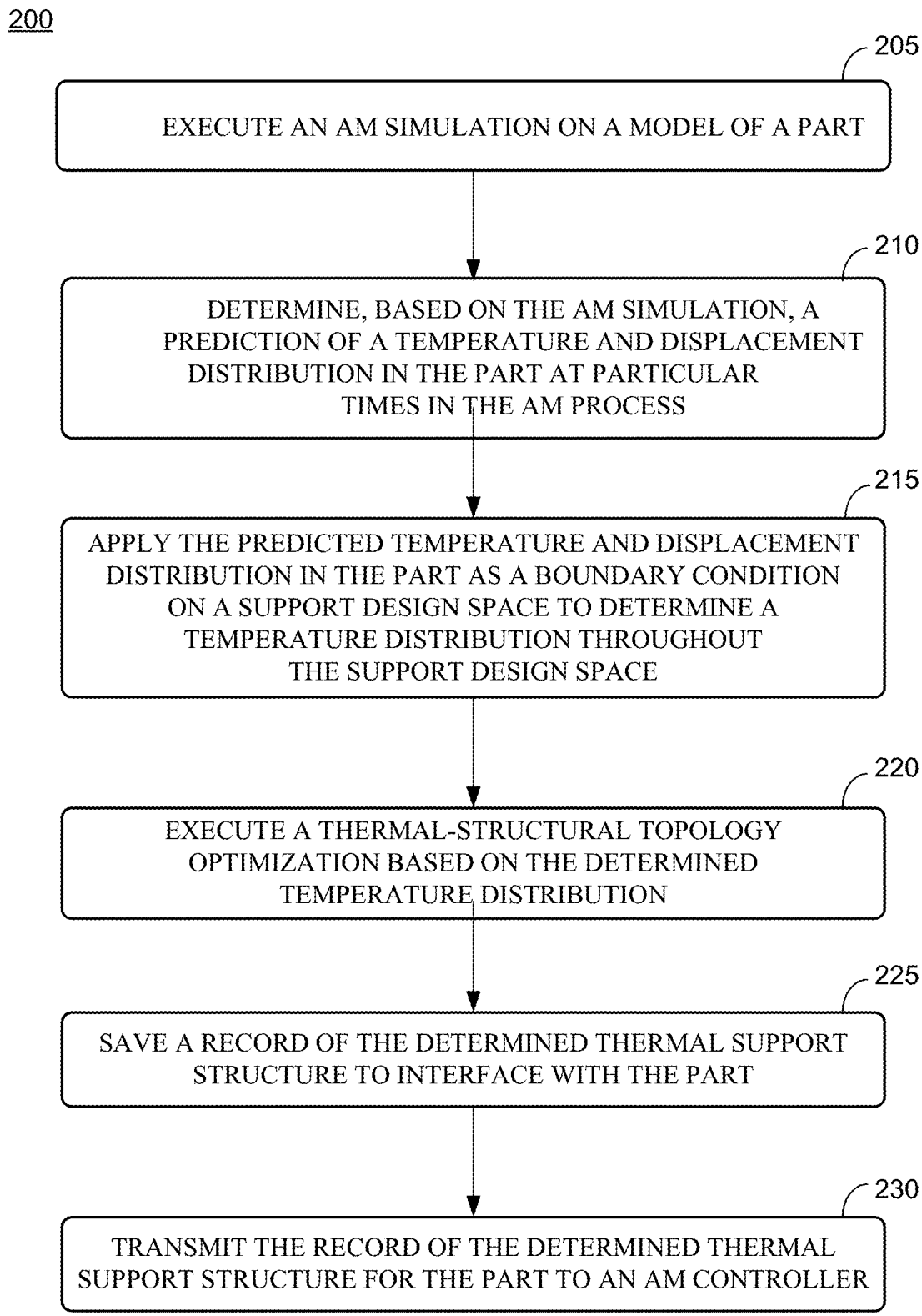
FIG. 2 is an illustrative flow diagram of an automatic support generation process, in accordance with some embodiments.

FIG. 2 is an illustrative flow diagram of an automatic support generation process 200, in accordance with some embodiments. At operation 205, an AM simulation may be executed on a model of a part to be produced by the simulated AM process. In some embodiments, the model of the part may be generated, specified, or otherwise defined prior to operation 205. In some embodiments, the execution of the AM simulation of operation 205 is executed on the model of the part, without supports. In some embodiments, the generation or defining of the part may be accomplished in conjunction with or as part of operation 205, though it is not a necessary function of operation 205. In some aspects, process 200 is not limited to any particular AM process, system, or device, unless stated otherwise herein.

At operation 210, a prediction of a temperature and displacement distribution within the part is determined based on the AM simulation at a particular time in the AM process. That is, the temperature distribution is determined based on a specific "load-step" at a particular point in time (i.e., snapshot in time) of the AM process. In some embodiments, either one or multiple "load-steps" (corresponding to one or multiple different, distinct snapshots in time), or the entire AM process may be considered in determining the predicted temperature distribution in the part, wherein the predicted temperature distribution in the part is valid for all of the one or more "load-steps".

In some aspects, the predicted temperature distribution in the part may be viewed as a load (e.g., the thermal load of the part) that will be considered by the subsequent operations of process 200. In some embodiments, other types of loads may be determined for a part, such as, for example, structural loads. In one embodiment, the structural loads for a part may be determined based on the mechanical distortions and corresponding forces placed on or created in a part during an AM build of the part. In some instances, an AM simulation herein might determine the thermal loads (e.g., thermal gradients) caused by an AM simulation herein, as well as the structural loads (mechanical distortions) caused by the AM simulation, wherein both of these (or other) loads are determined and used by subsequent operations of process 200.

At operation 215, the predicted temperature and displacement distribution in the part as determined at operation 210 may be applied as a boundary condition on a support design space to determine a temperature distribution throughout the support design space. In some embodiments, the support design space may be generated, specified, or defined prior to operation 215, including prior to or as an initial operation or function of process 200. In some embodiments or instances, the support design space used at operation 215 may including one or more design spaces, where the one or more support design spaces operate to fully accommodate the support structure being designed for the part being produced by the AM process of the example of FIG. 2.

At operation 220, a thermal-structural topology optimization may be executed on the determined temperature distribution to determine an (optimal) distribution of material in the design space(s) for a support structure to interface with the part that (optimally) reduces a thermal gradient in the part with a minimum amount of build material. The optimization performed at operation 220 may be executed with an objective to minimize the support volume and constraint(s) on stress and compliance, as per the design requirements/specification. In an embodiment where one or more additional types of loads are determined at operation 210 and applied at operation 215, then other types of supports in addition to the thermal supports structure may be determined in combination at operation 220. For example, in the instance structural loads are considered, then a structural support structure might also be determined at operation 220 that operates to counteract distortions due to mechanical loads induced on the part during the AM build process. That is, in some embodiments herein, process 200 may automatically generate support structures due to a plurality or multiple types of energy or forces (i.e., a multiphysics support structure).

In some aspects, the structural and/or thermal support structures may be designed with an optimum thermal conductivity, stiffness, and other properties to counteract the thermally-induced, mechanical force-induced, and other types of induced distortions, without imposing additional constraints or introducing additional distortions or changes into the part in their attempt to reduce or eliminate one or more types of predicted distortions.

At operation 225, a record of the determined geometry of the thermal support structure determined or otherwise generated at operation 220 may be saved for further use or processing. The record might be saved to a file, a database table, or other data structure in a format or configuration that might be persisted in a memory or data store, transmitted to a data store, warehouse, system, server, cloud, or other device, system, or facility.

Operation 230 is an example of a use or application of the determined (i.e., designed) thermal support structure. In one embodiment, the determined thermal support structure may be transmitted or otherwise communicated to a controller of an AM system or device. In response to a command to produce the part, the AM controller may operate to execute one or more instructions, programs, applications, and the like to produce the part and the thermal support structure as determined by the foregoing operations of process 200. In some embodiments where structural (and perhaps other types of) supports were determined in addition to the thermal support structure, then the structural (and perhaps other types of) supports may also be produced in conjunction with the part, in an effort to offset or counteract the thermal distortions and mechanical distortions (and perhaps other types of distortions).

In some embodiments, process 200 or at least portions thereof, may be iteratively repeated by obtaining or updating a support design, (re-)running the AM simulation, and (re-)optimizing the results from the new AM simulation to determine a new updated support structure (e.g., operations 210-225). The iterative process might be repeated until a desired and/or acceptable thermal (and other) support structure(s) are obtained.

In some embodiments, process 200 might be executed with or without additive rules such as, for example, rules regarding part overhang angles, wherein a multiphysics approach (with additive rules) and a scenario without additive rules (i.e., strictly considering the thermal distortions) might be determined.

In some embodiments, process 200 might further include considerations of geometry dimensions control to, for example, control for minimal wall thickness printing, and/or other factors. In some embodiments, multiple different types of materials might be used in an AM design and production process herein. For example, one or both of the part and the support structure may be designed to use multiple types of materials, wherein the particular material used may depend on the design objectives of the AM process, including but not limited to the thermal conductivity of a thermal support structure, the rigidity of a structural support structure, and characteristics of the part and/or support structure(s) where the material of manufacture of the part and support structure(s) might differ from each other.

In some embodiments, a process herein might consider and further produce a part and/or the determined support structure(s) to facilitate or support the removability of the support structure(s). For example, a hatch pattern may be created at an intersection of the part and the support structure(s), a width of the support structure(s) might be restricted, access of (hand) tools to non-machined surfaces may be facilitated so that the support structure(s) may be removed by the tools, support structure(s) might be attached to machined surfaces of the part, and other considerations.

In some aspects, the support structures disclosed herein are not limited to being one particular structural configuration. For example, the support structures herein might include a solid material, a porous material, a fractal tree structure, unit cell structures with directional properties, varying density of unit cells, and other configurations.

Figures 3A, 3B, 3C:
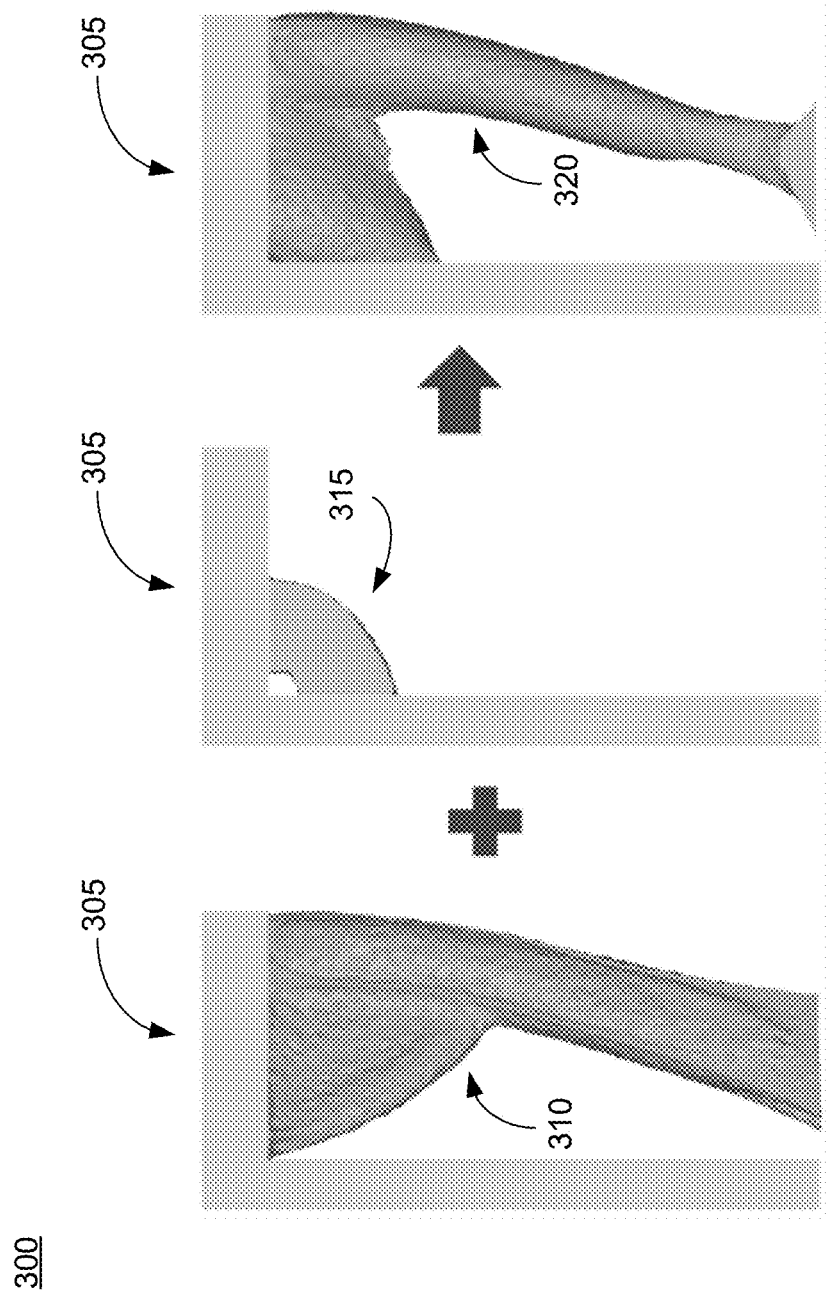
FIGS. 3A-3C are illustrative depictions of various phases of an automatic support generation process including a combination of support structures, in accordance with some aspects of an example process herein.

FIGS. 3A-3C are illustrative depictions of various phases of an automatic support generation process 300 including a combination of support structures, in accordance with some aspects of an example process herein. FIG. 3A includes a depiction of a part 305, which may be a portion of a larger part/assembly. Structural support structure 310 may represent a support structure generated when only applying a structural boundary condition to an optimization process, wherein AM simulation distortions are converted to forces and applied to the optimization process to determine structural support structure 310.

FIG. 3B includes a depiction of the part 305, which may form a portion of a larger part/assembly. Thermal support structure 315 may represent a thermal support structure generated by a process herein when only temperature distributions are applied as a boundary condition to an optimization process to determine thermal support structure 315.

FIG. 3C is the result of an automated multiphysics optimization performed in accordance with some aspects of the present disclosure, wherein structural boundary conditions that specify limitations for mechanical distortions and thermal boundary conditions that specify limitations for thermal temperature gradients in a part in order to achieve a uniform temperature distribution are both applied to an optimization that results in multiphysics support structure 320 for part 305. In some aspects, multiphysics support structure 320 is optimized both structurally and thermally. In some aspects, multiphysics support structure 320 might not be expected (i.e., unexpected) based on a visual review of the support structures of FIGS. 3A and 3B.

In some aspects, the present disclosure may contribute to or directly improve a design cycle time for additive parts since, for example, the part(s) and support structure(s) herein may be automatically optimized for thermal, structural (and other) distortions.

Figure 4:
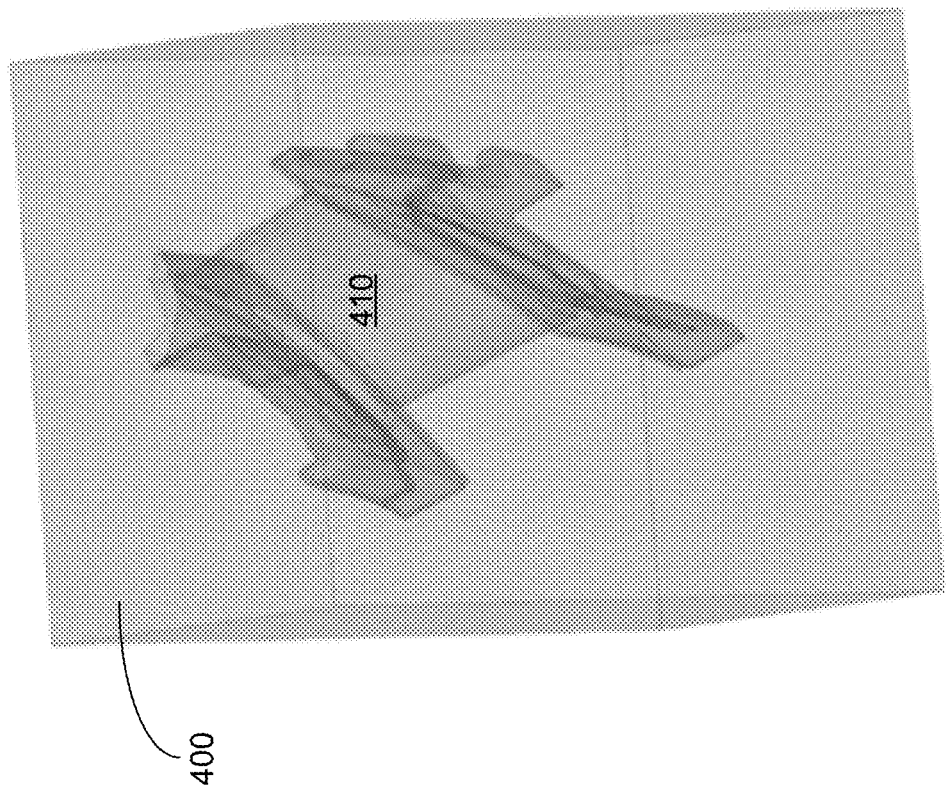
FIG. 4 is an illustrative depiction of a design space, in accordance with some aspects of an example process herein.

FIGS. 4-8 are illustrative depictions of various aspects of the present disclosure. FIG. 4 is an illustrative depiction of a design space, in accordance with some aspects of an example process herein. In the example of FIG. 4, support design space 405 is shown with a negative volume 410 therein corresponding to a part to be produced in the present example.

Figure 5:
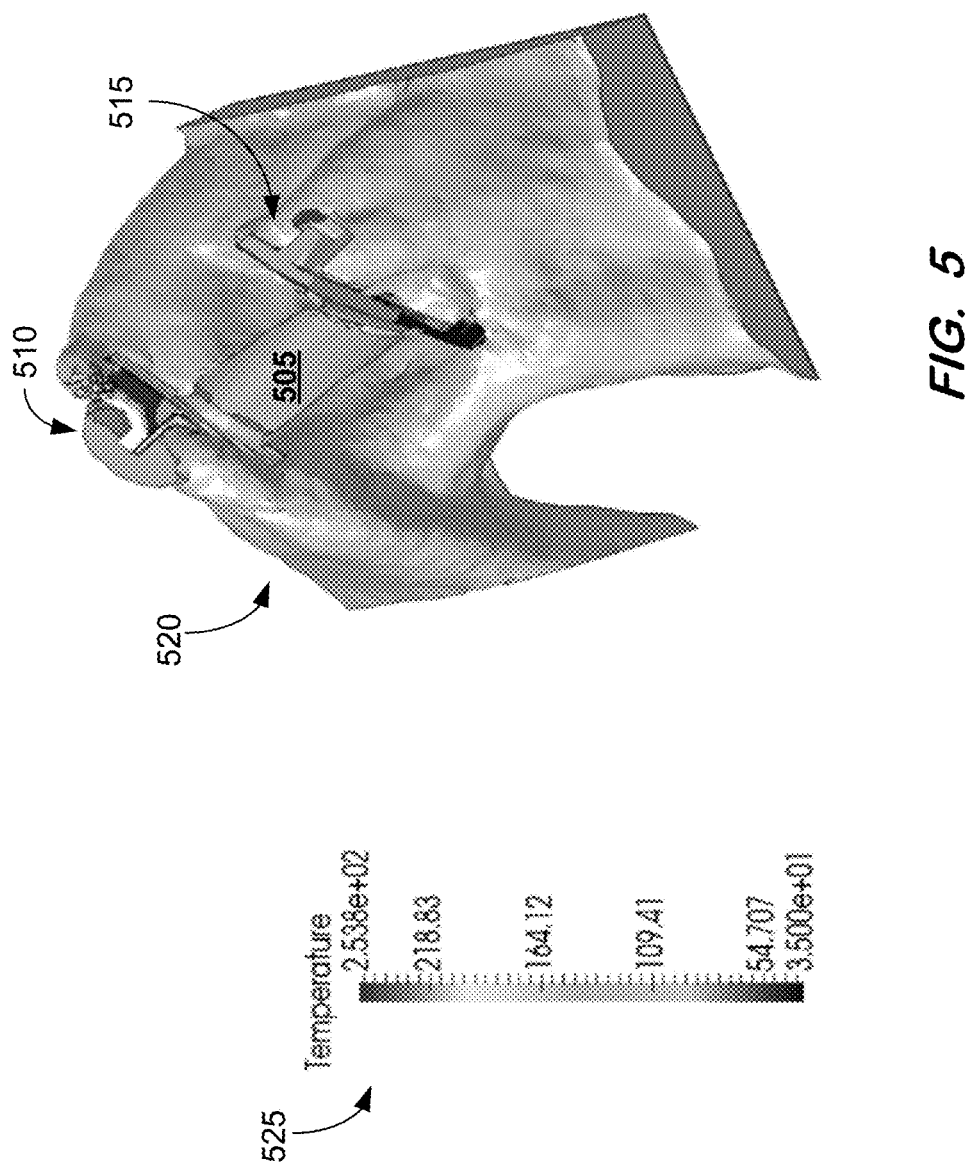
FIG. 5 is an illustrative depiction of a thermal and structural support structure after a first iteration of an example process herein.

FIG. 5 is an illustrative depiction of a thermal and structural support structure after a first iteration of an example process herein. In the example of FIG. 5, part 505 is shown with a representative temperature distribution at regions 510 and 515 and a support structure 520, where the temperatures mapped to the part have temperatures as indicated in temperature range key 525.

Figure 6:
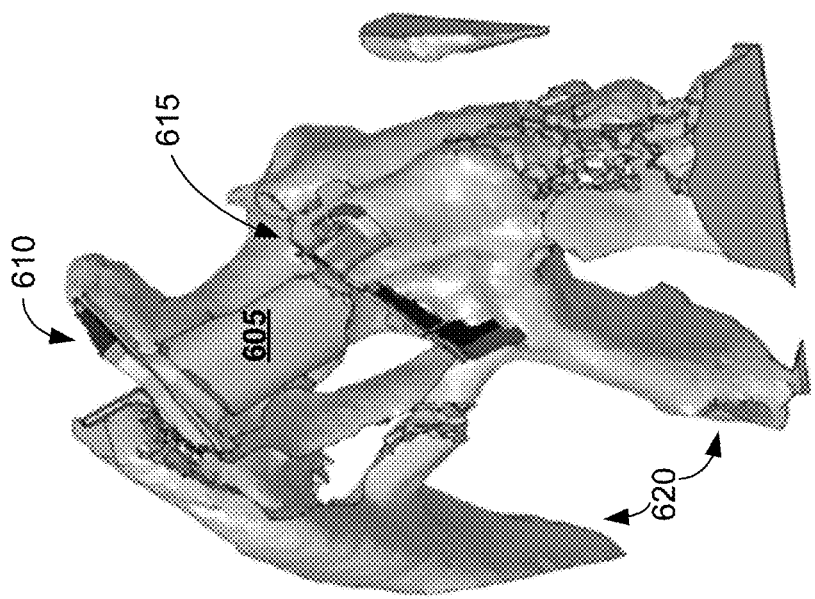
FIG. 6 is an illustrative depiction of a thermal and structural support structure after a second iteration of an example process herein.

FIG. 6 is an illustrative depiction of a thermal and structural support structure after a second iteration of an example process herein. Relative to FIG. 5, the volume constraint for FIG. 6 is reduced, although other constraints remain unchanged. In the example of FIG. 6, part 605 is shown with a representative temperature distribution at regions 610 and 615 and a support structure 620.

Figure 7:
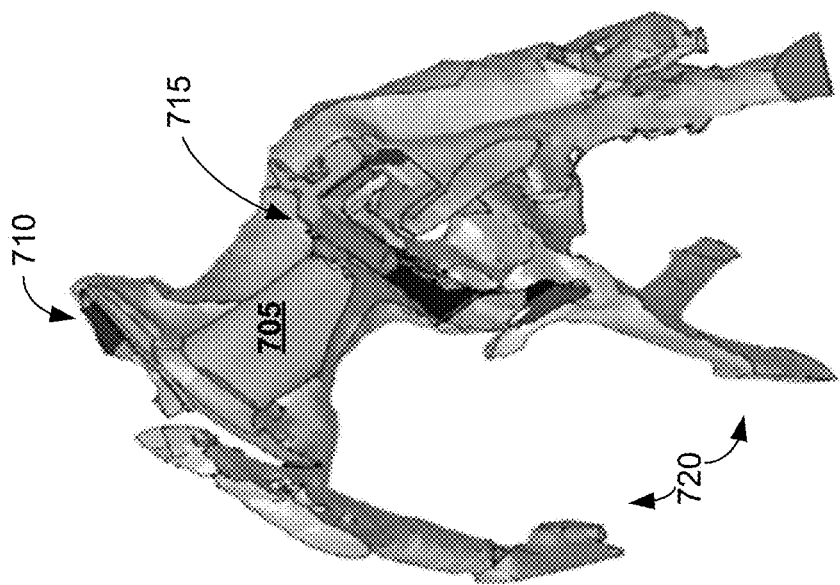
FIG. 7 is an illustrative depiction of a thermal and structural support structure after a third iteration of an example process herein.
Figure 8:
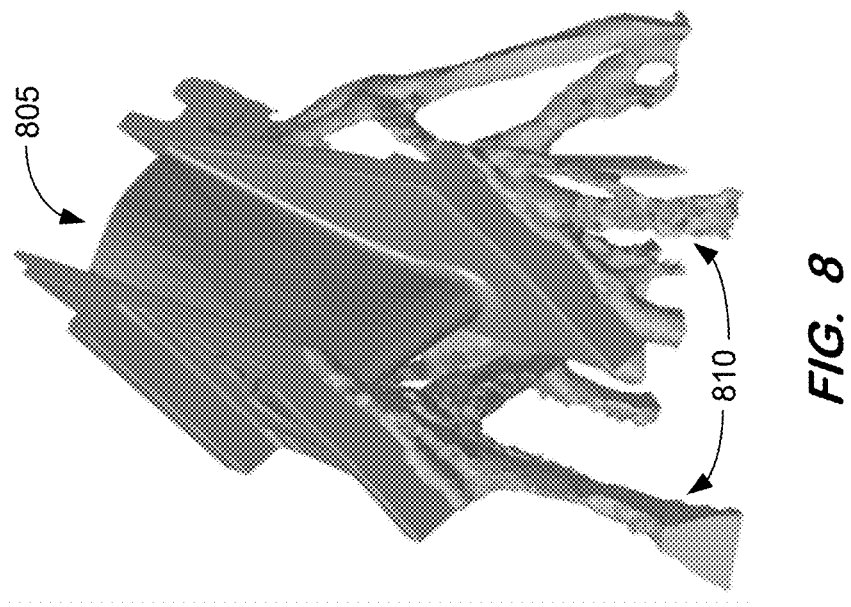
FIG. 8 is an illustrative depiction of an optimized thermal and structural support structure of an example process herein.

FIG. 7 is an illustrative depiction of a thermal and structural support structure after a third iteration of an example process herein. Compared to FIG. 6, the volume constraint for FIG. 7 is reduced, although other constraints remain unchanged. In the example of FIG. 7, part 705 is shown with a representative temperature distribution at regions 710 and 715 and a support structure 720. As seen in a comparison of FIGS. 5-7, the volume of the support structure decreases as the support volume evolves through the iterations therein to a final optimized configuration. FIG. 8 is an illustrative depiction of a final optimized thermal and structural support structure of an example process herein. In the example of FIG. 8, part 805 is shown with optimized thermal and structural supports 810.

Figure 9:
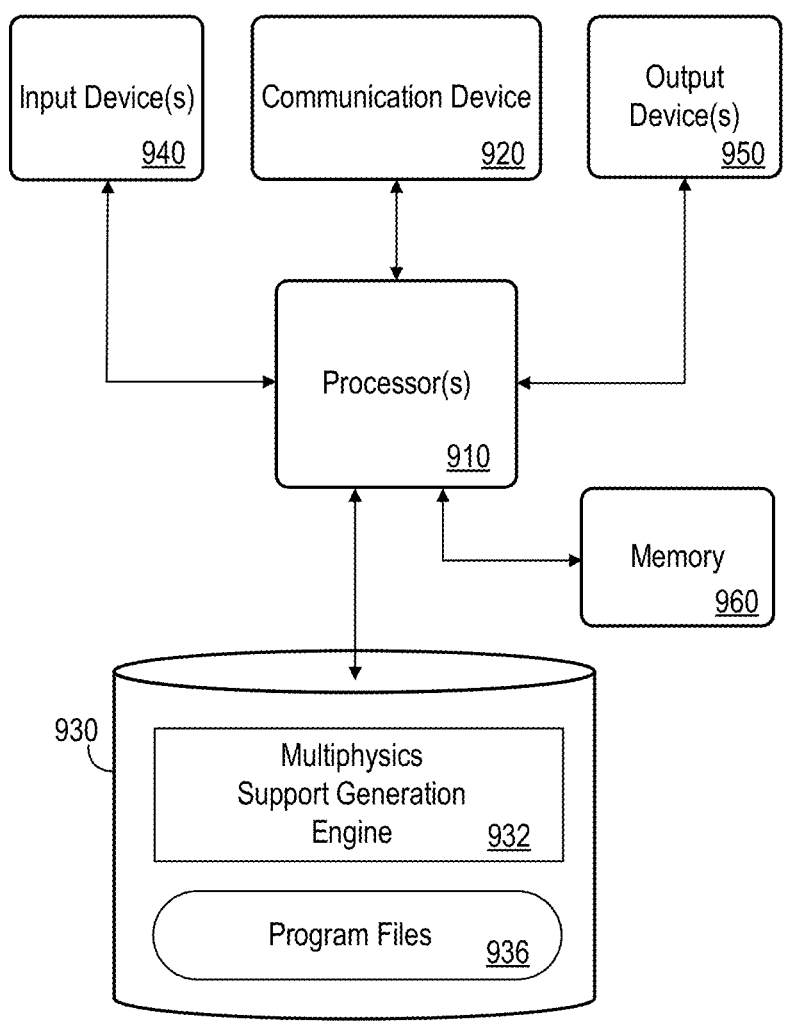
FIG. 9 illustrates a schematic diagram of a system, in accordance with some embodiments.

FIG. 9 is a block diagram of computing system 900 according to some embodiments. System 900 may comprise a general-purpose or special-purpose computing apparatus and may execute program code to perform any of the methods, operations, and functions described herein. System 900 may comprise an implementation of one or more systems (e.g., a thermal support design tool, a multiphysics support design tool, an AM system or parts thereof, etc.) and processes (e.g., 100, 200, and 300). System 900 may include other elements that are not shown, according to some embodiments.

System 900 includes processor(s) 910 operatively coupled to communication device 920, data storage device 930, one or more input devices 940, one or more output devices 950, and memory 960. Communication device 920 may facilitate communication with external devices, such as a data server and other data sources. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into system 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM), Storage Class Memory (SCM) or any other fast-access memory.

Multiphysics support generation engine 932 may comprise program code executed by processor(s) 910 (and within the execution engine) to cause system 900 to perform any one or more of the processes described herein. Embodiments are not limited to execution by a single apparatus. Data storage device 930 may also store data and other program code 936 for providing additional functionality and/or which are necessary for operation of system 900, such as device drivers, operating system files, etc.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods disclosed herein, such as a method of determining a design a part and a combination of a thermal support structure and a structural support structure.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

What is claimed is:

1. A method comprising:
    executing, by a processor, an additive manufacturing (AM) simulation on a model of a part;
    determining, by the processor and based on the AM simulation, a prediction of a temperature distribution and a displacement distribution in the part at a particular time in an AM process;
    applying the predicted temperature and displacement distributions in the part as a boundary condition on a support design space to determine a temperature distribution throughout the support design space;
    executing, by the processor, a thermal-structural topology optimization based on the determined displacement distribution throughout the support design space to determine a distribution of material in the support design space for a thermal support structure that reduces a thermal gradient in the part, the thermal support structure to interface with the part;
    saving a record of the determined thermal support structure to interface with the part; and
    transmitting the record of the determined thermal support structure for the part to an AM controller, the AM controller to control an AM system to generate the part and the thermal support structure based on the model of the part and the record of the determined thermal support structure for the part.

2. The method of claim 1, wherein the prediction of the temperature and displacement distributions in the part is determined based on an evaluation of the part at multiple distinct times in the AM process.

3. The method of claim 2, wherein the multiple distinct times comprise the entirety of the AM process and the predicted temperature and displacement distributions in the part, alone or in combination with mechanical loads on the part due to the AM process, is applied as boundary conditions on the support design space to determine a temperature distribution and mechanical distortions throughout the support design space.

4. The method of claim 1, wherein the support design space comprises a plurality of separate design spaces.

5. The method of claim 1, further comprising:
    determining, by the processor and based on the AM simulation, a prediction of structural distortions of the part due to the AM process;
    applying, by the processor, the structural distortions as boundary conditions on the support design space to determine structural stresses throughout the support design space;
    executing, by the processor, a topology optimization based on the determined structural stresses throughout the support design space to determine a distribution of material in the support design space for a structural support structure that interfaces with the part and reduces distortions in the part;
    saving a record of the determined structural structure to interface with the part; and
    transmitting the record of the determined structural support structure for the part to an AM controller, the AM controller to control an AM system to generate the part based on the model of the part and a structural support structure for the part in accordance with the record of the determined thermal support structure and the record of the determined structural structure.

6. The method of claim 5, wherein the structural support structure has an optimum rigidity that counteracts distortions due to the determined structural stresses while imparting minimal additional constraints on the part.

7. The method of claim 1, further comprising modifying the model of the part based on, at least in part, the determined thermal support structure for the part.

8. The method of claim 1, wherein the AM system is controlled to generate the part and the thermal support structure with a gap between the part and the thermal support structure that facilitates a heat conduction path therebetween without providing structural support to the part.

9. The method of claim 1, wherein the thermal-structural topology optimization is executed on one of the part alone and the part in combination with a support structure.

10. The method of claim 1, wherein the AM system is controlled to generate the thermal support structure comprising a configuration other than a homogeneous solid.

11. A system comprising:
    a memory storing processor-executable instructions; and
    one or more processors to execute the processor-executable instructions to:
        execute an additive manufacturing (AM) simulation on a model of a part;
        determine, based on the AM simulation, a prediction of a temperature distribution and a displacement distribution in the part at a particular time in an AM process;
        apply the predicted temperature and displacement distributions in the part as a boundary condition on a support design space to determine a temperature distribution throughout the support design space;
        execute a thermal-structural topology optimization based on the determined temperature distribution throughout the support design space to determine a distribution of material in the support design space for a thermal support structure that reduces a thermal gradient in the part, the thermal support structure to interface with the part;
        save a record of the determined thermal support structure to interface with the part; and
        transmit the record of the determined thermal support structure for the part to an AM controller, the AM controller to control an AM system to generate the part based on the model of the part and a thermal support structure for the part in accordance with the record of the determined thermal support structure.

12. The system of claim 11, wherein the prediction of the temperature and displacement distributions in the part is determined based on an evaluation of the part at multiple distinct times in the AM process.

13. The system of claim 12, wherein the multiple distinct times comprise the entirety of the AM process and the predicted temperature and displacement distributions in the part, alone or in combination with mechanical loads on the part due to the AM process, is applied as boundary conditions on the support design space to determine a temperature distribution and mechanical distortions throughout the support design space.

14. The system of claim 11, wherein the support design space comprises a plurality of separate design spaces.

15. The system of claim 11, wherein the one or more processors to execute the processor-executable instructions to:
determine, and based on the AM simulation, a prediction of structural distortions of the part due to the AM process;
apply the structural distortions as boundary conditions on the support design space to determine structural stresses throughout the support design space;
execute a topology optimization based on the determined structural stresses throughout the support design space to determine a distribution of material in the support design space for a structural support structure that interfaces with the part and reduces distortions in the part;
save a record of the determined structural support structure to interface with the part; and
transmit the record of the determined structural support structure for the part to an AM controller, the AM controller to control an AM system to generate the part based on the model of the part and a structural support structure for the part in accordance with the record of the determined thermal support structure and the record of the determined structural structure.

16. The system of claim 11, wherein the structural support structure has an optimum rigidity that counteracts distortions due to the determined structural stresses while imparting minimal additional constraints on the part.

17. The system of claim 11, further comprising modifying the model of the part based on, at least in part, the determined thermal support structure for the part.

18. A non-transitory computer-readable medium storing processor-executable instructions thereon, the medium comprising:
instructions to execute an additive manufacturing (AM) simulation on a model of a part;
instructions to determine, based on the AM simulation, a prediction of a temperature distribution and a displacement distribution in the part at a particular time in an AM process;
instructions to apply the predicted temperature and displacement distributions in the part as a boundary condition on a support design space to determine a temperature distribution throughout the support design space;
instructions to execute a thermal-structural topology optimization based on the determined temperature distribution throughout the support design space to determine a distribution of material in the support design space for a thermal support structure that reduces a thermal gradient in the part, the thermal support structure to interface with the part;
instructions to save a record of the determined thermal support structure to interface with the part; and
instructions to transmit the record of the determined thermal support structure for the part to an AM controller, the AM controller to control an AM system to generate the part based on the model of the part and a thermal support structure for the part in accordance with the record of the determined thermal support structure.

19. The medium of claim 18, wherein the prediction of the temperature and displacement distributions in the part is determined based on an evaluation of the part at multiple distinct times in the AM process.

20. The medium of claim 19, wherein the multiple distinct times comprise the entirety of the AM process and the predicted temperature and displacement distributions in the part, alone or in combination with mechanical loads on the part due to the AM process, is applied as boundary conditions on the support design space to determine a temperature distribution and mechanical distortions throughout the support design space.

* * * * *